INDICATING APPARATUS EMPLOYING INDUCED CURRENT

Filed Dec. 31, 1958 2 Sheets-Sheet 1

INVENTORS
GEORGE E. OLSON
ROBERT S. SANFORD

BY Roger S. Smith
ATTORNEY

INDICATING APPARATUS EMPLOYING INDUCED CURRENT

Filed Dec. 31, 1958 2 Sheets-Sheet 2

2,994,071
INDICATING APPARATUS EMPLOYING INDUCED CURRENT

George E. Olson, Wappingers Falls, and Robert S. Sanford, Poughkeepsie, N.Y., assignors to International Business Machines Corporation, New York, N.Y., a corporation of New York Filed Dec. 31, 1958, Ser. No. 784,356
3 Claims. (Cl. 340—174)

The present invention relates generally to electrical systems employing electromagnetic devices, and more particularly to means for producing and storing indications of the operation of electromagnetic devices in such systems. While the invention has wide application, it is particularly useful in electrical systems which employ a plurality of electromagnetic devices such as relays or magnets for performing operational functions and wherein it is desirable to provide indications of the operation of said devices.

An example of an electrical system employing electromagnetic devices to perform operational functions is a record card punching machine circuit such as that shown in U.S. Patent No. 2,647,581. Card punching machines such as the one shown in the above mentioned patent employ electromagnets and relays to control punching and printing operations. It is desirable for purposes of error checking and for controlling collateral operations to provide means for indicating operation of the punch controlling magnets in the machine. Preferably such indicating means should also be capable of storing the indications obtained to permit use thereof at later times during the operational cycle of the machine.

In recent years, cores constructed of magnetic material exhibiting relatively high residual magnetism characteristics have become popular as information storage elements. Such cores may be readily magnetized in either of two opposite directions by application of magnetizing force thereto, and once so magnetized, will remain in a stable condition of magnetic remanence until disturbed by some new magnetic force. If the two possible stable remanence conditions are identified with items of information such as "yes" and "no," for example, then "yes" and "no" information may be stored in a core by driving it to the proper magnetic remanence state. The information thus stored may be retrieved at will by driving the core to a selected one of its stable states and observing whether or not a flux reversal takes place therein.

Because of their relative simplicity and ruggedness it is desirable to use magnetic cores as the means for storing indications of operations of the punch controlling magnets in the above described electrical system. To be acceptable, the magnetic storage means must be responsive to changes in the operative state of electromagnetic devices with which they are associated and yet totally insensitive to all other circuit manifestations, including manifestations occurring due to changes in the operative state of other similar devices in the circuit. Substantial difficulties arise in the fulfillment of these requirements. It is not feasible to simply connect the activating means for a magnetic storage element in series or in parallel with the associated electromagnetic device so that it will be energized each time operating current flows in the circuit of the associated electromagnetic device. The substantial differences in power requirements and speed of operation of the electromagnetic devices and the magnetic storage elements make such connections impractical. Furthermore, an indication that current is flowing in the circuit of an electromagnetic device is not necessarily an indication that the device has operated. Circuit connections for the magnetic storage devices which make use of the voltage variations between selected points in the circuits of the electromagnetic devices and some reference point are also impractical. In circuits such as that shown in the above mentioned prior patent, considerable voltage fluctuations occur throughout the circuit due to operation of any one of the electromagnetic devices. These fluctuations are frequently large enough to give rise to unwanted spurious indications.

The most significant source of the voltage fluctuations existing in circuits of the type hereinbefore described is the phenomenon known as "inductive kick" characteristic in all circuits containing highly inductive elements such as electromagnets and relays. This "inductive kick" is an electromotive force, or voltage, which appears in the circuit of an electromagnetic device upon de-energization thereof. The inductive kick voltage is induced during the collapse of the magnetic field of the electromagnetic device, and represents the dissipation of the energy stored in the field. The induced E.M.F., conventionally represented by the symbol $e$, is proportional to the inductance L and the rate of change of current $$\frac{di}{dt}$$

in the circuit. The relation is equationally expressed as $$e=-L\frac{di}{dt}$$

Examination of this equation will show that, assuming L to be constant, the magnitude of the induced E.M.F. is directly proportional to the rate of change of the supply current. Thus, when an inductive circuit is de-energized the inductive kick is proportional to the speed with which the supply current is reduced from its steady state value to zero. Theoretically, if the supply current could be cut off instantaneously, the inductive kick voltage would reach infinite magnitude. In practice, of course, this condition cannot obtain, since some small amount of time is consumed during current decay, even where the current is cut off by breaking the circuit. Nevertheless, the inductive kick voltage actually experienced may be quite large, and is frequently great enough to cause destructive arcing at the point where the circuit is broken.

Applicants have found that this normally undesirable circuit characteristic may be utilized to provide indications of the operation of the device with which it is associated. Accordingly, it is a principal object of this invention to provide in a circuit employing an electromagnetic device, means for utilizing the inductive kick of said device to indicate operation thereof.

Another object of the invention is to provide, in a circuit employing an electromagnetic device, magnetic storage means responsive to de-energization of said device for storing indications that said device has been energized and subsequently de-energized.

More specifically, it is an object of this invention to provide, in an electrical circuit employing electromagnetic devices, magnetic storage means associated with certain of said devices and operable to be activated by the energy released by the collapsing fields of the devices with which they are associated as said devices are deenergized, whereby to store indications of the operation of said devices.

It is also an object of this invention to provide means for absorbing at least a part of the energy released by the collapsing field of an electromagnetic device whereby to reduce the normally destructive effects thereof.

Other objects of the invention, as well as the nature and advantages thereof, will be pointed out in the following description and claims and illustrated in the accompanying drawings, which disclose, by way of example, the principle of the invention and the best mode, which has been contemplated of applying that principle.

In a record card punching machine such as the one shown in U.S. Patent 2,647,581 mentioned earlier herein, record cards are punched in accordance with information supplied by an input means provided as part of the machine. The input means may be a manually operated keyboard or a device for reading a pre-punched card or tape. In any event, the input means, whatever its form, energizes selected electromagnetic devices which in turn cause operation of punch means associated therewith to perforate a record card at a specific point thereon.

The electromagnetic devices which cause operation of the several punches may be relays which open and close punch actuating circuits, or they may be electromagnets or solenoids which operate interposer bars to cause transmission of motion from some moving means to selected punch means, as shown in the above-mentioned patent.

Figure 1:
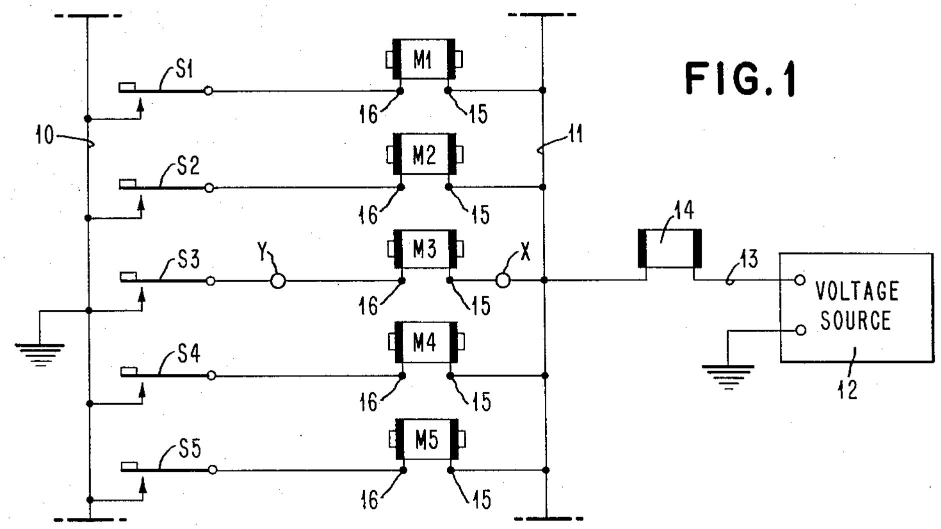
FIGURE 1 is a fragmentary circuit diagram illustrating a portion of a card punching machine circuit to which the present invention is particularly adapted.

FIGURE 1 shows a fragmentary portion of a typical punching machine circuit. The portion shown includes the electromagnetic devices, in this case interposer magnets, which control the operation of punches (not shown) for perforating cards to represent numbers from one to five, inclusive. The magnets are identified by the characters M1, M2, M3, M4 and M5. It will be understood, of course, that the machine includes more than the five interposer magnets shown, but since all are connected in similar fashion it is believed that the showing of FIGURE 1 will suffice to illustrate the characteristics of the circuit.

The interposer magnets M1–M5 are controlled by corresponding switches S1, S2, S3, S4, and S5 connected in series therewith as indicated in FIGURE 1. The switches S1–S5 are opened and closed by means (not shown) under control of the input means of the machine to select interposer magnets in accordance with the information supplied to the input means. The series combination of switches S1–S5 and magnets M1–M5 are all connected between two common buses 10 and 11. The common bus 10, to which one side of each switch S1–S5 is connected, is led to ground as indicated by the conventional symbol. The common bus 11 is electrically connected to a voltage source 12 by a conductor 13. Interposed in the conductor 13 is an electromagnetic utilization device 14 which is intended to be operated in common with each of the magnets M1–M5. The utilization device 14 in the circuit shown is a print relay which conditions card printing means (not shown) each time one of the several interposer magnets M1–M5 is operated.

Examination of the circuit of FIGURE 1 will show that the closing of any one of the switches S1–S5 will complete a circuit from the power source 12 through the relay 14 and through the one of the paralleled magnet circuits having its switch closed, to the grounded bus 10. Thus, the relay 14 is operated each time any one of the magnets M1–M5 is energized.

Figure 2:
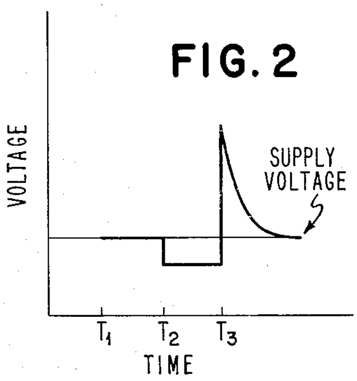
FIGURE 2 is a graph illustrating the voltage fluctuation with respect to ground at point $x$ of FIGURE 1 during a typical operation of the circuit.
Figure 3:
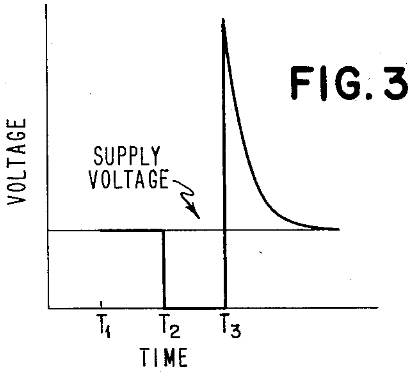
FIGURE 3 is a graph illustrating the voltage fluctuation with respect to ground at point $y$ of FIGURE 1 during a typical operation of the circuit.
Figure 4:
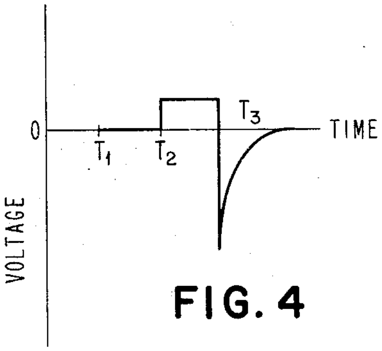
FIGURE 4 is a graph illustrating the magnitude of the voltage drop across one of the magnets during operation thereof.

In a circuit of this type, considerable voltage fluctuations occur throughout the circuit whenever any one of the magnets M1–M5 is operated. These fluctuations result, primarily, from the inductive kick of the relay 14 and magnets M1–M5 as they are de-energized. FIGURES 2, 3, and 4 illustrate voltage fluctuations with respect to ground at representative points in the circuit during a typical operation thereof wherein magnet M3 is operated by closing and subsequently opening switch S3.

FIGURE 2 represents the voltage fluctuation at point $x$ on the common bus 11. Time $T_1$ on the graph of FIGURE 2 represents a condition of quiescence when all switches S1–S5 are open. At this time the bus 11 is at the voltage of the supply source 12 as are all other circuit points to the right of the open switches S1–S5. Time $T_2$ represents the time when switch S3 is closed. At this time, the voltage of bus 11 drops to some value less than the supply voltage due to the voltage drop across relay 14. Bus 11 will remain at this reduced potential for so long as the switch S3 is closed. When the formerly closed switch S3 is opened at time $T_3$, however, and the magnetic field of relay 14 collapses, the voltage on bus 11 will rise, due to the inductive kick of relay 14, to some value above the supply voltage. As shown in FIGURE 2 this voltage rise is only a transient condition and the voltage of bus 11 quickly drops down to its quiescent value as the energy of the collapsing field of relay 14 is dissipated.

While FIGURE 2 illustrates the voltage at point $x$ only, it will be apparent to those skilled in the art that this same fluctuation will appear at all points in those paralleled magnet circuits through which no current is flowing. In the example given, where switch S3 is closed and then opened, the fluctuation shown in FIGURE 2 will appear at the right side of each of the open switches S1, S2, S4 and S5.

FIGURE 3 illustrates the voltage fluctuation at the point $y$ in the circuit of FIGURE 1 when switch S3 is closed and opened. The times $T_1$, $T_2$, and $T_3$ are the same as those in FIGURE 2. At time $T_1$ when all switches are open, the voltage at point $y$ is equal to the supply voltage. When switch S3 is closed at time $T_2$ the point $y$ is connected directly to ground and its potential drops to zero. At time $T_3$, however, when switch S3 is opened again, the combined inductive kicks of relay 14 and magnet M3 cause the voltage at point $y$ to rise to some value several times the magnitude of the supply voltage. This high voltage appears across the contacts of the switch S3 as they open. It is generally great enough to cause the air gap between the separating contacts to break down in a destructive arc, in which the energy of the collapsing fields is quickly dissipated. Hence, the voltage quickly drops to the supply voltage value, as illustrated in FIGURE 3.

While the graph of FIGURE 3 represents the voltage fluctuation at point $y$ when switch S3 is operated, it will be understood that this same fluctuation will appear at corresponding points in each of the other paralleled circuits when the switches therein are operated.

The voltage fluctuations caused by the inductive kicks of the several electromagnetic devices and illustrated in FIGURES 2 and 3 create serious problems in the provision of reliable means for storing indications of operations of the interposer magnets. The voltage variations shown are great enough to give erroneous indications unless indication means which are insensitive to these variations are adopted. The means provided in accordance with the teachings of the present invention are insensitive to these fluctuations as will later appear and thus avoid the problem of erroneous indications.

According to this invention, the normally undesirable and destructive voltages induced when the magnets M1–M5 are de-energized are utilized to provide the indications desired. The energy released upon collapse of the magnetic field of each of the magnets M1–M5 is more than sufficient to drive a magnetic storage element. Moreover, this energy is normally wasted in a destructive arc across the opening contacts of the magnet energizing switch, so its utilization does not deleteriously affect the circuit in any way.

The energy released by collapse of the magnetic field of an electromagnet such as the interposer magnets M1–M5 creates a potential between the terminals of the magnet which is of reverse polarity to the voltage drop across the magnet when energized. FIGURE 4 illustrates this phenomenon. The graph of FIGURE 4 represents the voltage differential between the high potential terminal 15 and the low potential terminal 16 of the interposer magnet M3 during operation thereof. The times $T_1$, $T_2$, and $T_3$, shown, are the same as those shown in FIGURES 2 and 3. At time $T_1$, when no current is flowing through magnet M3, there is no voltage drop between its terminals 15 and 16. At time $T_2$, when the switch S3 is closed, a voltage drop of some value less than the supply voltage appears due to the impedance of the magnet M3 to current flow. This drop appears from the high potential terminal 15 to the magnet M3 to the low potential terminal 16, and is arbitrarily shown in FIGURE 4 as positive.

At time $T_3$, when switch S3 is opened, the supply current to magnet M3 is cut off, and the magnetic field thereof is permitted to collapse. Collapse of the field releases the energy stored therein back into the circuit and creates a relatively large induced voltage, as shown by the negative peak in FIGURE 4. The polarity of this voltage is reversed, with respect to the voltage drop during operation of the magnet, bringing terminal 16 more positive than terminal 15. Depending upon the speed with which the supply current is reduced to zero, this voltage may reach large values, frequently several times greater than the supply voltage, but it is transient and decays rapidly as shown.

According to the present invention, this induced voltage, or inductive kick, is made use of as the means for activating the indication storage means. As mentioned earlier herein, the storage means comprise bistable magnetic cores which may be driven to one or another state of magnetic remanence by application of magnetizing force thereto. Suitable core material for this purpose should have a relatively wide hysteresis loop such as that shown in FIGURE 6. The loop is preferably substantially rectangular, and wide enough to provide substantial remanent flux at the points of zero excitation, identified as P and N, in FIGURE 6. If one of these remanence points, for example point N, is selected to represent that operation of an electromagnet has not taken place, then the opposite remanence point P may be understood to represent that operation has taken place. Information that a magnet has operated may be stored by driving a core from state N to state P.

Figures 5, 6:
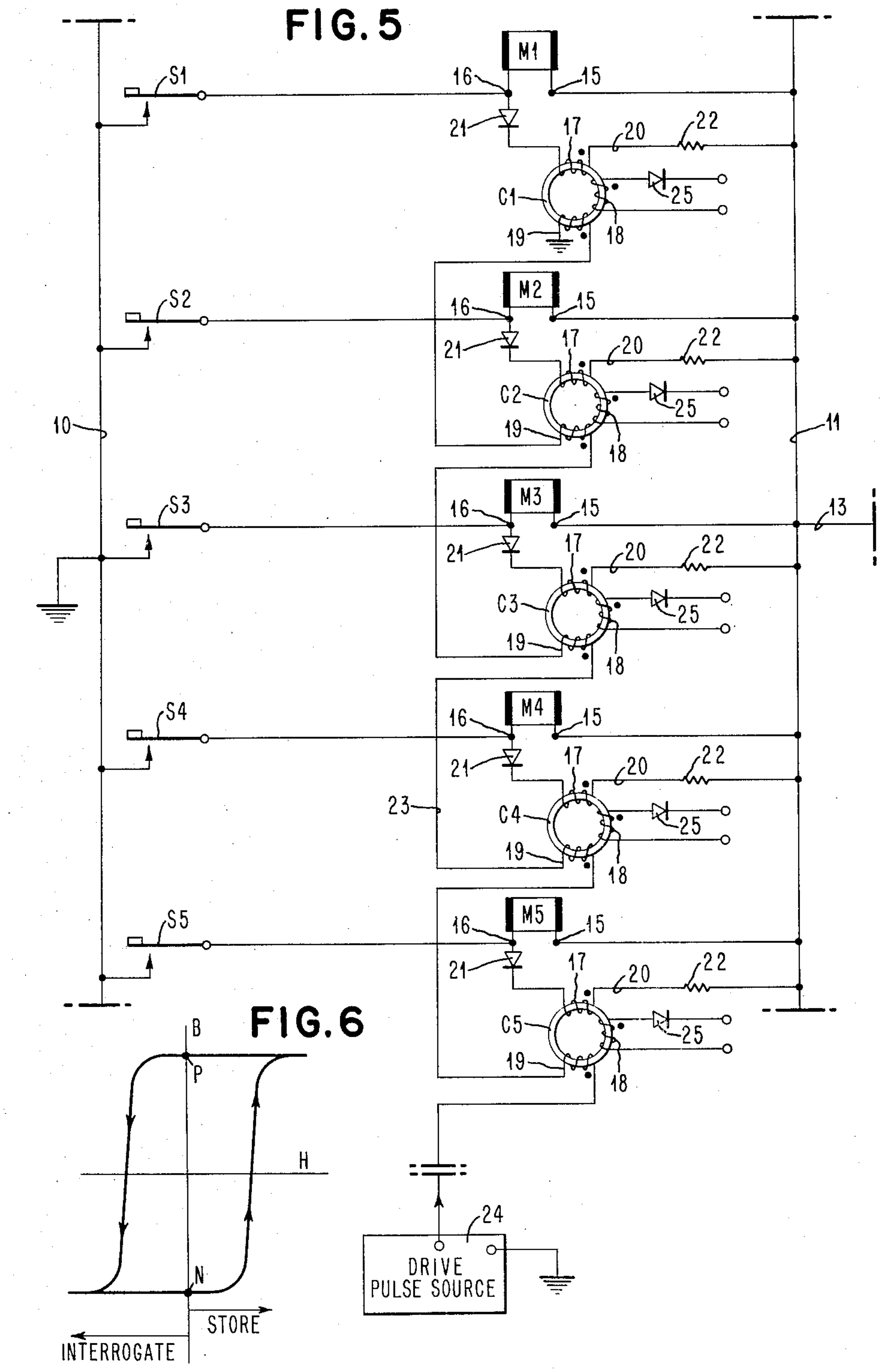
FIGURE 5 is a fragmentary circuit diagram similar to FIGURE 1 but showing means for storing indications of the operation of the several magnets in accordance with the present invention.
FIGURE 6 is a diagrammatic illustration of the hysteresis loop of one of the magnetic cores shown in FIGURE 5.

In accordance with this invention, magnetic cores C1, C2, C3, C4 and C5 having hysteresis loops similar to that of FIGURE 6 are provided for the interposer magnets M1–M5 as shown in FIGURE 5. Each core C1–C5 is provided with an input or activating winding 17, an output or sense winding 18, and a reset and interrogating winding 19. The sense of these several windings is shown by the dots in FIGURE 5. According to the notation adopted herein, current flowing into the dotted end of a winding will drive the core from the P remanence state to the N remanence state. Current flowing into the undotted end of a winding will drive the core from an N remanence state to a P remanence state. The dots of FIGURE 5 also indicate the polarity of voltage induced in a winding by a flux change in the core coupled therewith. When a core traverses its hysteresis loop from point N to point P the voltage induced in windings coupled thereto will be negative at the dotted end. When a core traverses its loop from point P to point N, the induced voltage will be positive at the dotted ends of the associated windings.

The input winding 17 of each core C1–C5 is interposed in a line 20 which is connected in shunt between the terminals 15 and 16 of the associated magnet M1–M5. A diode or other similar unidirectional conducting device 21 is also connected in each line 20 in series with the winding 17. As will be seen in FIGURE 5, the diode 21 is connected so that current flow through line 20 from the terminal 15 to the terminal 16 is prevented. Thus, during energization of the associated magnet M1–M5, while terminal 15 is more positive than terminal 16, there will be no current flow in line 20, and the operation of the magnet will be unaffected. When the supply current is interrupted to de-energize the magnet, however, and the magnetic field thereof collapses, the reverse polarity voltage induced by said collapsing field will bring terminal 16 more positive than terminal 15, biasing the diode 21 in the low impedance direction and causing current flow in the line 20 from terminal 16 to terminal 15. The inductive kick voltage induced in the magnet will thus serve as a power source, and the line 20 will serve as a discharge circuit therefor. This discharge current flowing in the line 20 will pass through the winding 17 to switch the core C1–C5 coupled thereto.

To limit the inductive kick voltage to a value suitable for operating the cores C1–C5 and to lengthen the discharge time to provide sufficient time to fully switch the cores, resistors 22 may be provided in the circuits 20. By proper selection of resistance values one skilled in the art may adjust the discharge voltage and time to provide proper operation. The value of resistance used will, of course, depend upon the characteristics of the magnets and the storage cores concerned in each individual case. It is not believed necessary to specify herein example values since the selection of component values is well within the purview of the skilled technician.

With the circuit hereinbefore described, the inductive kick of any one of the magnets M1–M5 occurring upon de-energization thereof, will bias the diode 21 in its discharge circuit 20 in the forward direction and cause current to flow through the input winding 17 of its associated core C1–C5 in a direction to drive the core to the P remanence state, thus storing in the core information that the magnet has been energized and subsequently de-energized. The windings 19 coupled to the cores C1–C5 serve as interrogating and reset windings. As illustrated in FIGURE 5, the windings 19 for the several cores C1–C5 are connected in a single series circuit 23, one end of which is grounded, and the other end of which is connected to a source of current pulses 24. When it is desired to interrogate the cores C1–C5 to recover the information stored therein, a pulse is generated in the source 24 and sent through the circuit 23. This pulse will flow through the several windings 19 from the dotted ends to the undotted ends, causing all of the cores C1–C5 to be driven toward the N remanence state. Any core which was formerly in the P state, that is, storing information that its corresponding interposer magnet had been operated, will experience a flux reversal. This reversal will induce a voltage pulse in the output winding 18 coupled to the core providing a usable indication of operation of the associated magnet. Cores formerly in the N state already will experience no such reversal, and will induce no such pulse in their output windings 18. The several output windings 18 may be connected to any suitable utilization means, depending upon the use for which they are desired. The particular means for utilizing the output indications does not form a part of this invention and is therefore not shown or described herein.

It will be observed that the operation of interrogating the cores C1–C5 is destructive, since it leaves all cores in the N state of magnetic remanence. The interrogation operation thus serves the additional purpose of clearing or resetting the cores to ready them for the next operation.

It will be noted that voltage pulses are induced in the output windings of the cores C1–C5 during each excursion thereof from one remanence state to the other, including excursions from the N state to the P state during the information storing operation. Output pulses are thus available both at the time the indications are stored in the cores and when they are read out. The pulses induced during storage are, of course, of opposite polarity to those induced during read-out. Since it is normally desirable to provide output pulses at only one of these times, a diode or other similar device 25 may be connected in series with each output winding 18 to block pulses of one polarity or the other. The diodes 25 shown in FIGURE 5 will block the pulses induced during storage and will pass those induced during read-out.

Examination of the circuit of FIGURE 5 will show that the operation of storing an indication in one of the cores C1–C5 not only provides a potential output on the winding 18, but also induces a voltage in the reset winding 19. At the time this voltage appears, however, the circuit 23 which includes the several windings 19 is inactive, and is effectively open. The voltage induced therein thus has no effect.

It is believed apparent from the foregoing that the present invention provides means for producing and storing indication of the operation electromagnetic devices which are both economical and efficient. Since the activating or input circuit 20 of each storage element is connected directly between the terminals of the electromagnetic device with which the storage element is associated, and since the diode 21 prevents current flow in the circuit 20 except in response to the inductive kick of the magnet upon de-energization, indications may only be stored in a core C1–C5 when the associated magnet M1–M5 has actually built up a proper magnetic field and then been de-energized. The storage core associated with each magnet is totally insensitive to any other circuit manifestation. It may be said, therefore, that the indications produced and stored are true and reliable indications of the proper operation of the associated device.

It should be noted that the indication producing and storing means provided in accordance with this invention is operated substantially entirely by means of energy already present in the circuit, and normally wasted. Except for the interrogating pulse source 25, no additional power supplying means need be provided, and the capacity of the power source for the interposer magnets need not be increased. It will also be appreciated that the herein disclosed means performs a useful collateral function in addition to the primary function thereof. By utilizing the normally destructive inductive kick of the interposer magnets to perform a useful function, the harmful effects thereof, including arcing at the switch S1–S5 are at least minimized, if not wholly relieved.

While the invention has been described herein in connection with the interposer magnets M1–M5 only, it will be understood that all interposer magnets in a circuit for which indications are desired may be provided with indication producing and storage means without departing from the spirit of the invention. It should also be understood that the invention is not limited to use with interposer magnets alone, but is equally well suited for use with any inductive circuit element which exhibits inductive kick upon de-energization.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In an electrical network which includes a plurality of electromagnetic elements connected in parallel circuits to a common power source, each of said parallel circuits having switch means therein for selectively energizing the associated electromagnetic element, the improvement comprising separate means associated with each said electromagnetic element for producing and storing indications of the operation thereof, each said separate indication producing and storing means comprising a magnetic storage element capable of assuming first and second alternate states of magnetic stability, input winding means magnetically coupled to said storage element and operable when energized to cause said storage element to assume the first of said stable states, circuit means connected with said input winding means and with said electromagnetic element for energizing said input winding means only in response to the voltage induced by de-energization of said electromagnetic element, reset winding means magnetically coupled to said storage element operable when energized to cause said storage element to assume the second of said magnetic states, and output means coupled to said storage element operably responsive to changes of said storage element from one of said stable states to the other.

2. In an electrical network which includes a plurality of electromagnetic elements connected in parallel circuits to a common power source, each of said parallel circuits having switch means therein for selectively energizing the associated electromagnetic element, the improvement comprising separate means associated with each said electromagnetic element for producing and storing indications of the operation thereof, each said separate indication producing and storing means comprising a magnetic storage element having alternate states of magnetic stability, input winding means magnetically coupled to said storage element operable when energized to cause said element to assume a first one of its alternate states, circuit means connecting said input winding means in parallel with said electromagnetic element, unidirectional conducting means connected in said circuit means in series with said input winding means for preventing current flow through said winding means while said electromagnetic element is energized and for permitting current flow caused by the counter electromotive force induced in said electromagnetic element upon de-energization whereby to cause said input winding means to be energized upon de-energization of said electromagnetic element, interrogating winding means magnetically coupled to said storage element operable when energized to cause said storage element to assume the other of its alternate states, and output winding means wherein voltage pulses are induced upon change of the storage element from one state to another.

3. The invention defined in claim 2 including a common energizing circuit connected to the interrogating winding means of each said magnetic storage element and operable when activated to read out in parallel the indications stored in said storage elements.

References Cited in the file of this patent

UNITED STATES PATENTS

| | | |
|---|---|---|
| 2,538,789 | Maynard | Jan. 23, 1951 |
| 2,695,993 | Haynes | Nov. 30, 1954 |
| 2,742,632 | Whitely | Apr. 17, 1956 |